Figure 1:
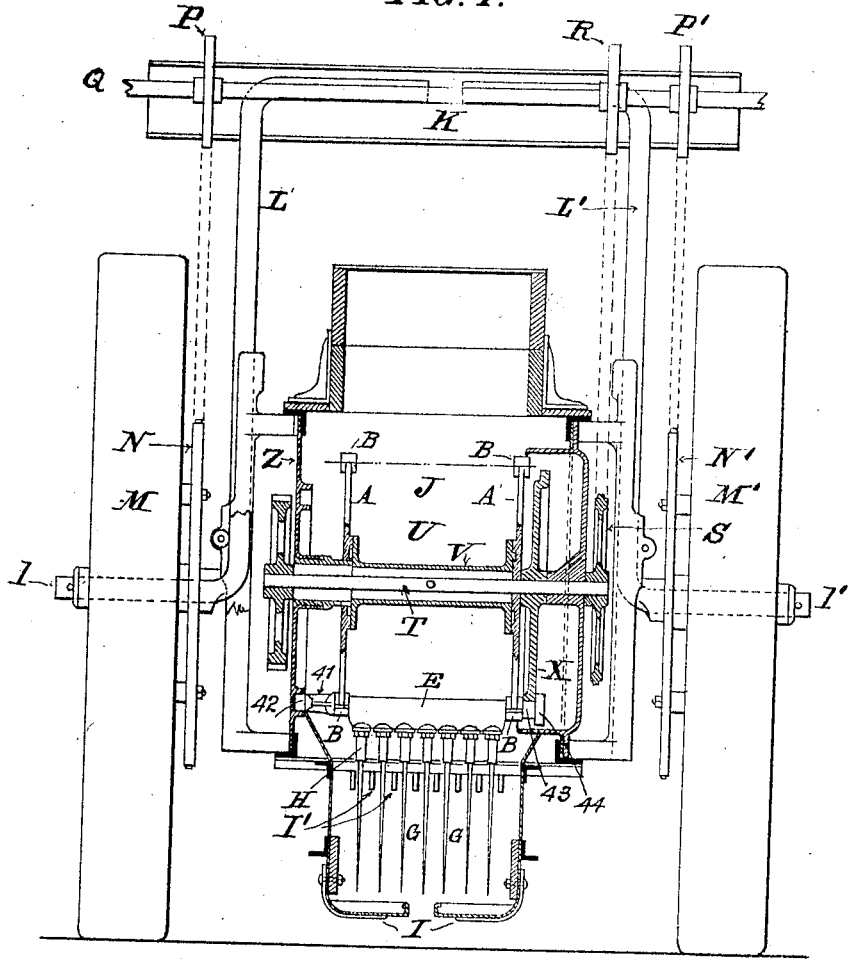

R. C. SCHERLING.
COTTON HARVESTER.
APPLICATION FILED FEB. 19, 1910.

1,035,645.

Patented Aug. 13, 1912.
3 SHEETS—SHEET 1.

Witnesses:
E. R. Knudsen
A. G. Peterson

Inventor:
Rudolph C. Scherling,
By Michael J. Stark & Sons,
Attorneys.

R. C. SCHERLING.
COTTON HARVESTER.
APPLICATION FILED FEB. 19, 1910.
1,035,645.
Patented Aug. 13, 1912.
3 SHEETS—SHEET 2.
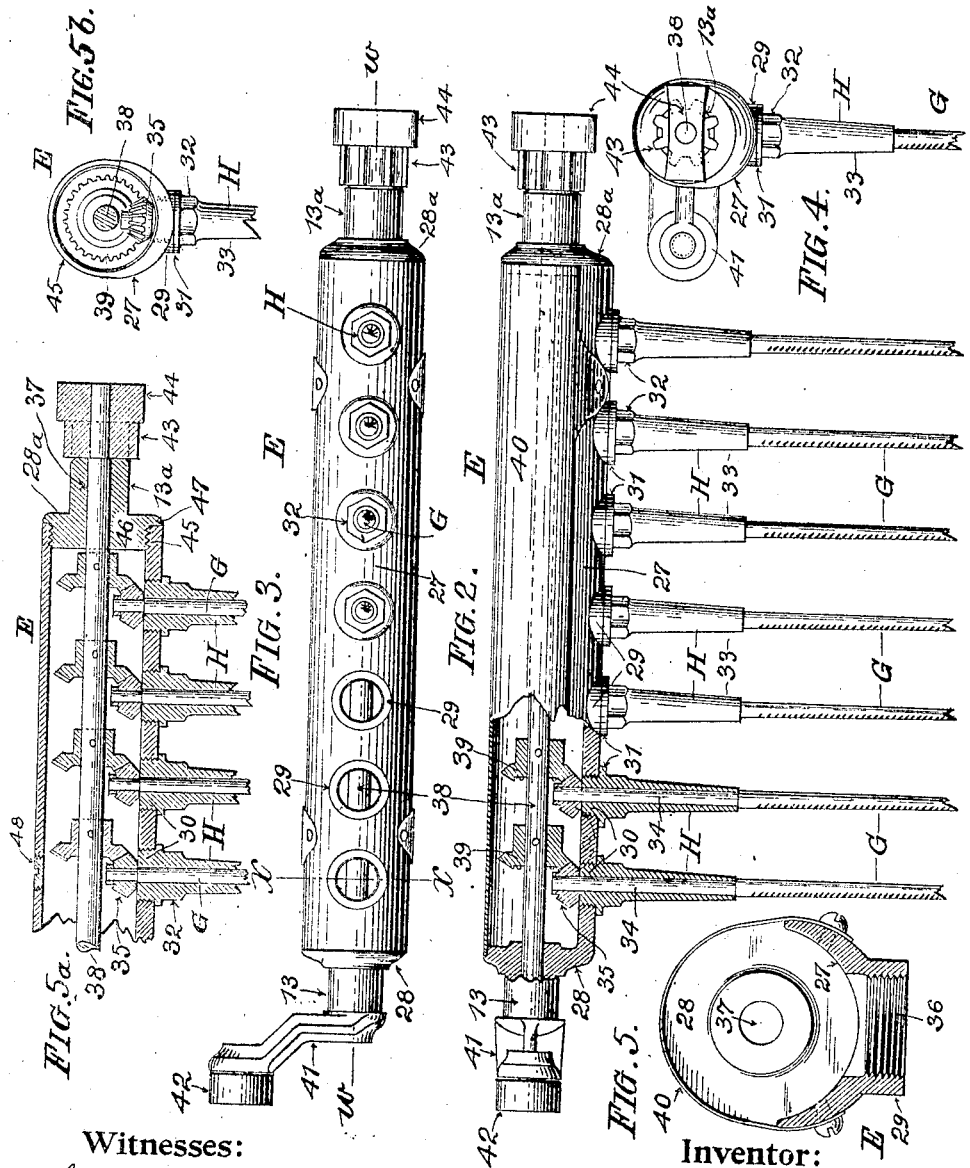
Witnesses:
C. B. Knudsen
A. B. Peterson
Inventor:
Rudolph C. Scherling,
By Michael J. Stark & Sons,
Attorneys.

R. C. SCHERLING.
COTTON HARVESTER.
APPLICATION FILED FEB. 19, 1910.
1,035,645.
Patented Aug. 13, 1912.
3 SHEETS—SHEET 3.
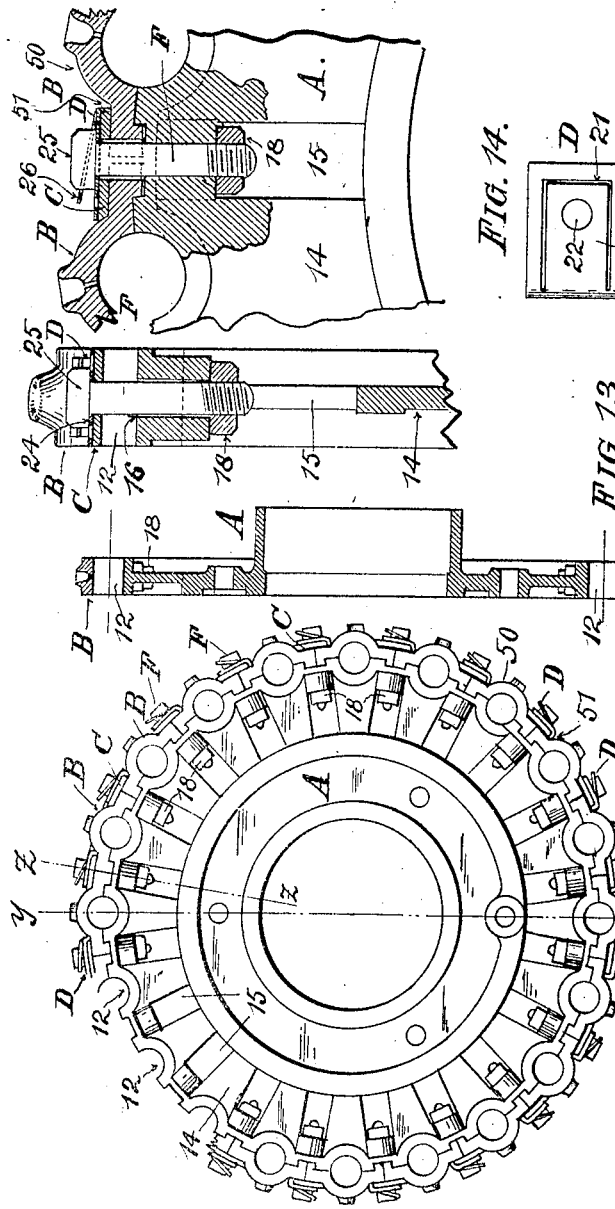
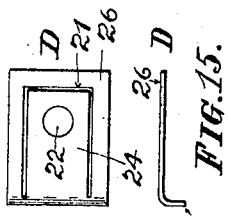
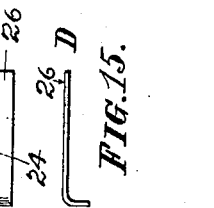
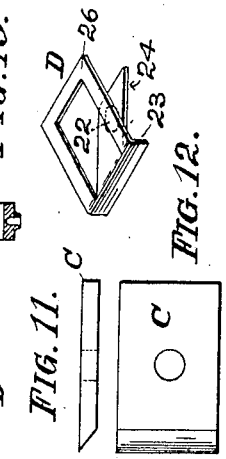
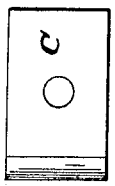
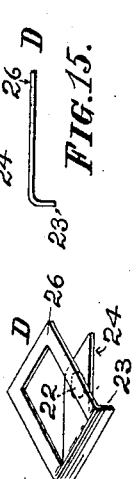
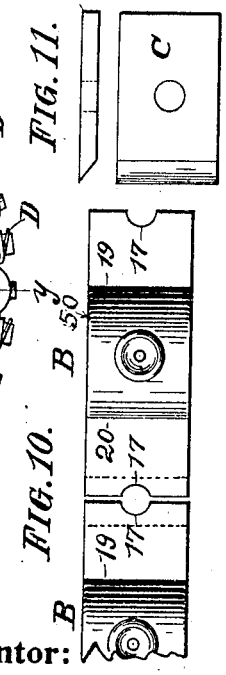
Witnesses:
E. B. Knudsen,
A. S. Peterson
Inventor:
Rudolph C. Scherling,
By Michael J. Stark & Sons,
Attorneys.

UNITED STATES PATENT OFFICE.

RUDOLPH C. SCHERLING, OF CHICAGO, ILLINOIS, ASSIGNOR TO HENRY E. BULLOCK AND JAMES E. BULLOCK, BOTH OF CHICAGO, ILLINOIS.

COTTON-HARVESTER.

1,035,645.  Specification of Letters Patent.  Patented Aug. 13, 1912.

Application filed February 19, 1910.  Serial No. 544,925.

*To all whom it may concern:*

Be it known that I, RUDOLPH C. SCHERLING, a citizen of the United States, and resident of Chicago, in the county of Cook and State of Illinois, have invented certain new and useful Improvements in Cotton-Harvesters; and I do hereby declare that the following description of my said invention, taken in connection with the accompanying sheets of drawings, forms a full, clear, and exact specification, which will enable others skilled in the art to which it appertains to make and use the same.

This invention has general reference to cotton harvesters; and it consists, essentially, in the novel and peculiar combination of parts and details of construction, as hereinafter first fully set forth and described, and then pointed out in the claims.

In the drawings already referred to, which serve to illustrate this invention more fully, Figure 1 is an outline rear elevation, partly in section, of a cotton harvester embodying my improvements. Fig. 2 is a side elevation of one of the columns and its picking spindles as used in this machine, the figure being partly in section to disclose details of construction. Fig. 3 is a plan of the same. Fig. 4 is an end view of a modified form of the column, and Fig. 5 is a transverse sectional view on line $x$ $x$ of Fig. 3. Fig. 5$^a$ is an elevation in section, of a fragment of the column shown in Fig. 4 in line $w$ $w$ of Fig. 3. Fig. 5$^b$ is an end elevation of the column shown in Fig. 4, the removable trunnion and the bevel-gear wheel adjacent to the same being removed. Fig. 6 is an elevation of one of the cylinder heads in which the columns are mounted. Fig. 7 is a sectional view of the same in line $y$ $y$ of Fig. 6. Fig. 8 is a similar view on an enlarged scale of a fragment of said cylinder head. Fig. 9 is an elevation, partly in section, of a portion of the cylinder head. Fig. 10 is a plan of two adjacent bearing caps. Fig. 11 is an end view of one of the washers employed in connection with the bearing caps. Fig. 12 is an inverted plan of the same. Fig. 13 is a perspective view of the locking washers. Fig. 14 is a plan of the same, and Fig. 15 is an end-view thereof.

Like parts are designated by corresponding symbols and characters of reference in all the various figures.

The object of this invention is the improvement of cotton picking machines to overcome certain defects which actual use of such a machine in the cotton fields has disclosed, the said improvements being especially directed to the cylinder with its columns and picking spindles. And in order that these improvements be thoroughly understood, I shall briefly describe the particular cotton harvester to which my inventions are applied.

By reference to Fig. 1, it will be observed that this machine includes a machine body J, of substantially rectangular contour which body is suspended from an overhead beam K, in a suitable manner, said overhead beam being carried by two, approximately S-shaped bars L, L', the lower members l, l', of which form axles upon which are mounted traction wheels M, M'. To these traction wheels are fastened sprocket wheels N, N', which connect, by suitable transmission belts, with sprocket wheels P, P', mounted upon a shaft Q, on the overhead beam K. Upon this shaft there is a driver sprocket R, which is connected with a driven sprocket S, by a suitable transmission belt, these transmission belts being indicated by dotted lines. The driven sprocket S is fastened to one end of a shaft T, which I term the cylinder shaft, and upon this shaft is mounted a cylinder U, comprising two cylinder heads A, A', connected together by a tubular, flanged, sleeve V. In this cylinder there are mounted a series of columns E, and each of these columns is supplied with a series of picking spindles G, rotated intermittently by pinions 43, engaging a mutilated, stationary, gear wheel X, the columns being rocked in the cylinder heads A A', by their cranks 41 and rollers 42, engaging a suitably constructed cam plate Z. In this Fig. 1, I have shown additional elements and parts, but since they do not require description in order to enable one skilled in the art to which this machine appertains, to understand the nature of my invention, I deem it unnecessary to describe the same. The operation of such a cotton picking machine is briefly, as follows: The machine is propelled by a team of horses over a row of cotton plants. These plants enter a channel in the machine body into which channel the picking spindles enter while rotating, and from which they are withdrawn to pick lint from the plant portions passing through said channel, a guard I, located under the machine body and in close proximity to the ground over which the machine is being moved, lifting the lower branches of the plants from the ground, while a grate I', prevents the plant portions from entering the machine body proper.

Having thus described in general terms the principal features of a cotton picking machine to which my invention relates, I shall now proceed to disclose those details of construction which embrace my invention: The cylinder, as heretofore stated, includes two end plates or cylinder heads A, A', the peripheries of which are provided with a series of semicircular notches 12, forming half-bearings for the columns, E. Midway between these bearings 12 there are in the web 14 openings 15, and leading from the periphery of the cylinder head into these openings 15 there are bolt holes 16, indicated in Fig. 8. Upon the periphery of the cylinder head there are located as many bearing caps B, as there are semicircular notches in said periphery, each cap having a semicircular depression forming a complete bearing for the trunnions 13, 13*, of the columns E. In the ends of these caps B there are semicircular notches 17, corresponding in position to that of the holes 16, two of these semicircular notches 17 forming a complete bolt hole for the passage of a machine bolt F, passing through said caps and the bolt-hole 16 in the periphery of said cylinder head, into the opening 15, in which the nut 18 of the bolt F is located, and which nut fits the sides of said opening 15 by an easy fit, but is prevented from rotating by its two opposing sides bearing against the sides of the opening 15. Upon the adjacent flanges of the bearing caps are located oblong washers C, shown in detail in Figs. 11 and 12, said washers bearing with one end against one side, 19, of the approximately semicircular portion 50 of the caps B, the other end of said washers being shorter so as to leave a narrow space 51, Figs. 6 and 9, between the washer and the opposite portion 20, of said caps B.

D, designates a bolt-lock. It comprises a substantially rectangular plate shown in detail in Figs 13, 14, and 15, in which plate there is a U-shaped incision 21, and a circular aperture 22, the latter aperture being provided for the passage of the bolt F. One end of this plate is bent at right angles at 23, which bent portion is adapted to engage the space 51 between the end of the washer C and the portion 20 of the bearing caps B, thereby preventing the plate D from being misplaced. The inner portion 24, of the plate D which has the bolt hole 22, serves as a washer upon which the head of the bolt F, indicated by the numeral 25, rests, while the outer U shaped portion 26 is adapted to be bent upwardly to embrace two opposing sides of the bolt head 25 and thereby prevents the latter from turning.

In cotton picking machines of the class described there are a large number of gear wheels which, when the machine is in operation, cause considerable vibration of the machine-parts, which has a tendency to slacken bolts and nuts, and cause them to drop out of position and be caught in the machine-parts resulting in damage thereto. This objection I have entirely overcome by the construction described, and have attained the further advantages that instead of using the so-called cap-screws in the bearing caps, as has heretofore been the case, I am enabled to use the much cheaper machine-screws termed machine-bolts, while at the same time I am enabled to remove any bearing cap B by only removing two of these bolts without slackening any of the bolts in the adjacent bearing caps.

E, designates one of the series of columns. It is, preferably a cast-metal body 27, having either an oblong, or a U-shaped transverse section. This body has on both of its ends heads, 28, 28*, respectively, from which heads the trunnions or journals 13, 13*, project. In the U-shaped portion of this column there are a series of internally screw-threaded bosses 29, in which bosses there are located, and in screw-threaded connection with the bore thereof, tubular bearings for the picking spindles G, each of said bearings comprising an externally screw-threaded part 30, a laterally-projecting flange 31, bearing upon the face of the boss 29, a polygonal portion 32, adapted to receive a wrench by which the tubular bearing is securely screwed into the boss 29, and the tubular portion 33, the whole being longitudinally bored to receive the shank 34 of the picking spindle G, and serving as a bearing for the same, said shank 34 being slightly smaller in diameter to form a shoulder on the picking spindle G bearing against the lower end of the tubular part 33. At the upper end of each of said shanks 34 there is located a bevel pinion 35, of a diameter slightly smaller than the bore of the bosses 29, so that the pinions may be first securely fastened to the shanks 34, and then passed into the column through the bore 36 thereof and then the tubular bearings H securely screwed into said bore. This construction is an important feature because it overcomes the difficulty heretofore experienced in securing the bevel pinions 35 to the shanks 34 when the picking spindles are inserted in bearings formed integral with the body of the columns, and the bevel pinions have to be fastened therein after the picking spindles have been placed in position. It accomplishes the further result that when it is desired to either replace or renew a bearing or a bevel pinion, it can be readily accomplished by unscrewing the proper bearing H.

In the heads 28 and 28ª of the columns there are shaft bearings 37, Figs. 5 and 5ª, within which rotates a shaft 38, carrying bevel wheels 39, that mesh with the bevel pinions 35 and rotate the same. When this column is made with a cover 40, to close the column and prevent cotton lint from reaching the pinions, as shown in Figs. 2, 3, and 5, the heads 28 and 28ª thereof may be formed integral with the trunnions, but I prefer the construction illustrated in Figs. 4, 5ª, and 5ᵇ, in which the column with its cover is made integral in the process of casting. In this case I may form the trunnion 13 integral with the head 28, but the trunnion 13ª is formed separate, and the end of the column-body left open and internally screw-threaded at 45, while on the head 28ª I form a shouldered, externally screw-threaded part 46, the shoulder 47 bearing against the end of the column. In this case I also provide a filling-plug 48, in the column so that the entire interior space of the column serves as a reservoir for a lubricant to lubricate the mechanism in the column and the shanks of the picking spindles. By thus constructing the column with the removable trunnion, I derive the important advantage that I can permanently affix the bevel wheels 39 upon the shaft 38 before the latter is placed in position in the column, a result which overcomes one of the drawbacks heretofore contended with, viz., that of the bevel wheels becoming loose upon their shaft and that, when necessary to remove a bevel wheel, all the bevel wheels had to be freed from the shaft before any one thereof could be removed.

To assemble a column, I first secure all the bevel wheels permanently upon the shaft 38; I then locate all the bevel-pinions on the picking spindles (after having placed the tubular bearings thereon); I then place the shaft with its bevel wheels in the column, and finally place all the tubular bearings with the picking spindles and their bevel pinions in position.

On the trunnion 13 there is formed a crank 41, having a roller engaging a tortuous groove in a cam-plate Z, Fig. 1, and on the outside of the shaft 38, which projects beyond the trunnion 13ª, there is located the pinion 43 which engages a mutilated gear-wheel X, Fig. 1, and the slide 44 which prevents the picking spindles from rotating during part of the rotation of the cylinder, in the well-known manner.

I have heretofore stated that I prefer the employment of machine bolts in the caps of the cylinder heads, but I desire it understood that I do not wish to confine myself to the use of these bolts, and that I may employ the heretofore-used cap screws, should I find them more desirable.

I have heretofore described in detail the construction of the cylinder head illustrated in Figs. 6 to 15 inclusive, but do not claim this part of my invention in the present application, since the same has been incorporated in a divisional application filed by me December 29, 1910, Serial No. 599,831.

Having thus fully set forth my invention, I claim as new and desire to secure to me by Letters Patent of the United States—

1. In a cotton picking machine, a cylinder, comprising two end plates; a rotating shaft upon which said end plates are mounted, a series of columns journaled in said end plates and connecting the same, each of said columns comprising a main body, a fixed trunnion on one end of said main body, and a removable trunnion on the other end of said main body; a series of picking spindles in each column, bevel pinions on the inner ends of said picking spindles, a longitudinal shaft in said main body, and bevel wheels on this shaft, said bevel wheels being adapted to mesh with the bevel pinions on said picking spindles, and to pass through the end of said main body.

2. In a cotton harvester, a column, comprising a hollow main body, a shaft in said main body there being a fixed trunnion on said main body and on one end thereof, a removable trunnion on the other end of said main body, said main body being open at the latter end to receive said removable trunnion, and means for retaining said latter trunnion in proper position in said main body, said removable trunnion being in axial line with said shaft and centrally bored to afford a bearing in said trunnion for said shaft.

3. In a cotton harvester, a column, comprising, a main body, a trunnion on one end of said main body, a removable trunnion on the other end of said main body, said main body being open at the latter end to receive said removable trunnion, means for retaining the removable trunnion in proper position in said main body, a series of removable tubular bearings projecting from said main body, a picking spindle in each of said tubular bearings, a bevel pinion at the inner end of each picking spindle, a longitudinal shaft in said main body, a series of bevel wheels upon said shaft adapted to engage said pinions, said shaft with its bevel wheels being adapted to be passed into the said main body through the open end thereof, and the bevel pinions being adapted to be passed into the said main body, and in engagement with said bevel wheels with said removable tubular bearings.

In testimony that I claim the foregoing as my invention, I have hereunto set my hand in the presence of two subscribing witnesses.

RUDOLPH C. SCHERLING.

Attest:
MICHAEL J. STARK,
RICHARD J. WUERST.